(12) United States Patent
Holbert

(10) Patent No.: US 6,739,093 B1
(45) Date of Patent: May 25, 2004

(54) FARM GATE STOP DEVICE

(76) Inventor: Charles S. Holbert, 390 Newton Valley La., New Haven, KY (US) 40051

( * ) Notice: Subject to any disclaimer, the term of this patent is extended or adjusted under 35 U.S.C. 154(b) by 0 days.

(21) Appl. No.: 10/290,981

(22) Filed: Nov. 8, 2002

Related U.S. Application Data

(60) Provisional application No. 60/332,254, filed on Nov. 14, 2001.

(51) Int. Cl.[7] .............................................. E05B 65/06
(52) U.S. Cl. ............................ 49/394; 256/73; 292/145
(58) Field of Search .............................. 256/24, 26, 73; 49/381, 394; 292/189, 143, 145, 150, 153

(56) References Cited

U.S. PATENT DOCUMENTS

| | | | |
|---|---|---|---|
| 238,876 A | 3/1881 | Fellows | |
| 544,716 A | 8/1895 | Alfred | |
| 611,676 A | 10/1898 | Cave | |
| 1,381,372 A | 6/1921 | Wanous | |
| 1,440,025 A | 12/1922 | Nicholson | |
| 1,521,112 A | 12/1924 | Lawrence | |
| 1,661,240 A | 3/1928 | Trimbach | |
| 3,836,186 A | 9/1974 | Kennedy | |
| 4,263,749 A | * 4/1981 | McDougle | .................... 49/394 |
| 4,790,578 A | 12/1988 | Barrera | |
| 5,275,382 A | * 1/1994 | Charbaut et al. | ............. 256/48 |
| D396,795 S | * 8/1998 | Francom | ..................... D8/339 |

* cited by examiner

Primary Examiner—Jerry Redman
(74) Attorney, Agent, or Firm—James E. Cole; Robert J. Theuerkauf; Middleton Reutlinger

(57) ABSTRACT

The present invention provides a farm gate stop device suitable for use on both level and unlevel terrain and reduces strain on the hinges of a gate. The farm gate stop device comprises a rod slide operably attached to a gate and a rod slidably connected to the rod slide. The rod slide has a plurality of notches in cooperation with a stud integral with the rod. The rod slide also has at least one rod guide which keeps the rod in a proper vertical alignment with the rod slide. The rod may be slidably adjusted within the at least one rod guide to hold the gate at which time the stud is moved into the notches of the rod slide to maintain the gate in a desired position.

15 Claims, 4 Drawing Sheets

FARM GATE STOP DEVICE

CROSS-REFERENCE TO PRIOR APPLICATIONS

This application claims priority to U.S. Patent Application No. 60/332,254, filed on Nov. 14, 2001, which is incorporated herein by reference.

BACKGROUND OF THE INVENTION

1. Technical Field of the Invention

The present invention relates to a farm gate stop device. More particularly the invention relates to a farm gate stop device suitable for use on level or unlevel ground and which prevents a gate from swinging open or closed from a desired position.

2. Description of the Related Art

Various devices have been used to hold gates in a substantially open or closed position.

For example, U.S. Pat. No. 544,716 to R. E. Alfred teaches a gate having an adjustable height near the hinges to counteract sagging and to allow a passage way for small animals if desired. At one end of the gate, opposite the hinges, a support bar is located having a plurality of shoulders. The shoulders are spaced apart vertically so that a loop can attach from the gate around the support bar and within one of the shoulders. However, the patent does not teach any means for stopping the rotation of the gate at any specific position other that the closed position.

Another example of a holding device is shown in U.S. Pat. No. 1,440,025 to Nicholson. The window controlling device comprises a guide having notches, a rod and a handle for locating within the notches. However, the device is used to control window height and linear motion in, for instance, an automobile but does not teach use with a gate having a rotating motion.

In view of the deficiencies in the known farm gate stops it is apparent that a device is needed for holding a farm gate in a plurality of positions on level or unlevel ground.

SUMMARY OF THE INVENTION

It is an object of the present invention to provide a farm gate stop device.

It is a further objective of this invention to provide a farm gate stop device capable of use on both level and unlevel surfaces.

It is a further objective of this invention to provide a farm gate stop device capable of use on both level and unlevel surfaces and easily installed to a plurality of farm gates.

It is a further objective of this invention to provide a farm gate stop device capable of use on both level and unlevel surfaces and easily installed to a plurality of farm gates and which is capable of relieving the pressure of the primary hinges of the farm gate when the gate is in an open position.

All of the above outlined objectives are to be understood as exemplary only and many more objectives of the invention may be gleaned from the disclosure herein. Therefore, no limiting interpretation of the objectives noted are to be understood without further reading of the entire specification and drawings included herewith.

BRIEF DESCRIPTION OF THE DRAWINGS

The aspects and advantages of the present invention will be better understood when the detailed description of the preferred embodiment is taken in conjunction with the accompanying drawings, in which.

DETAILED DESCRIPTION OF THE PREFERRED EMBODIMENT

Figure 1:
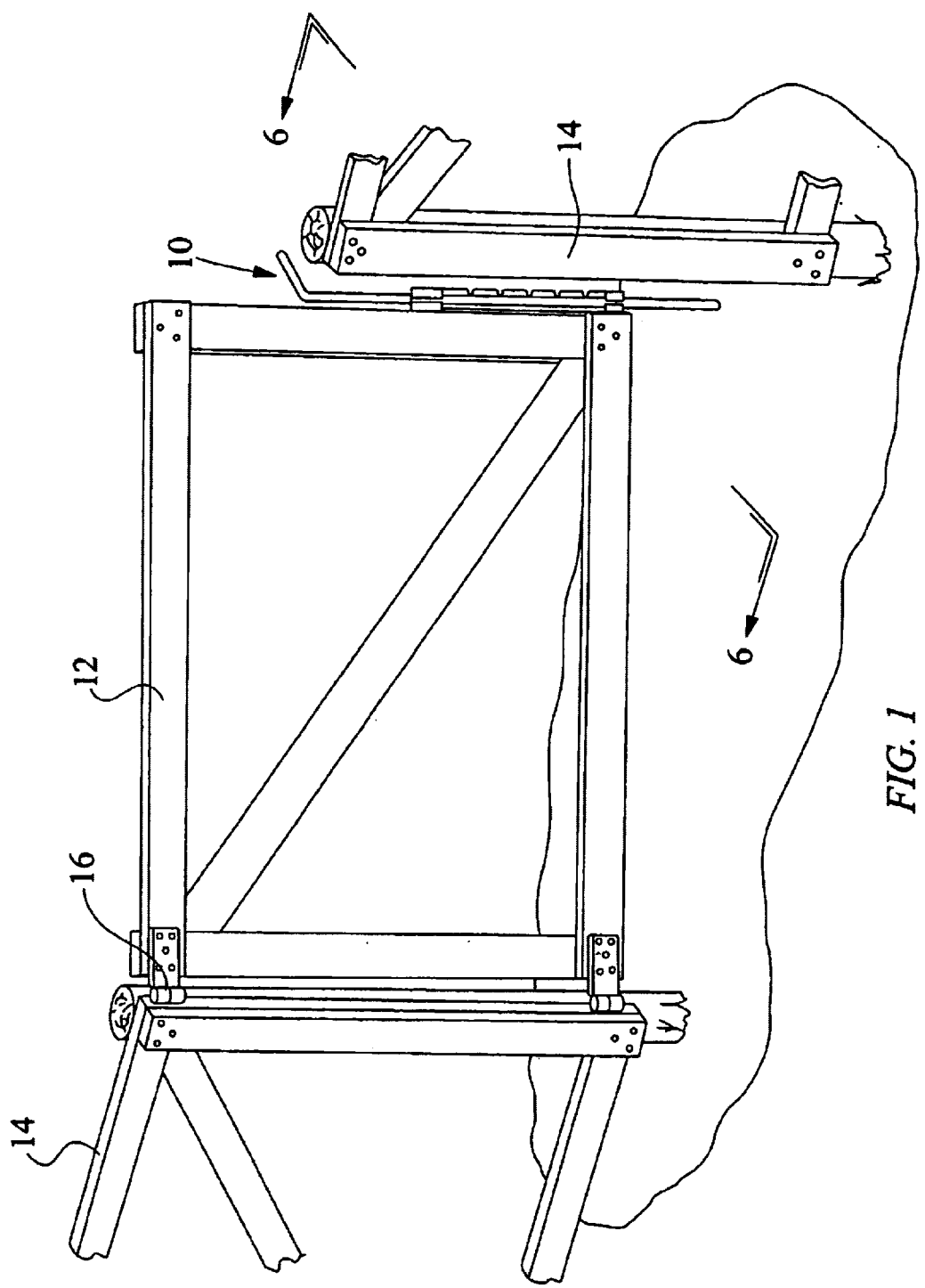
FIG. 1 shows a front perspective view of the farm gate stop device attached to a farm gate in a partially open position.
Figure 2:
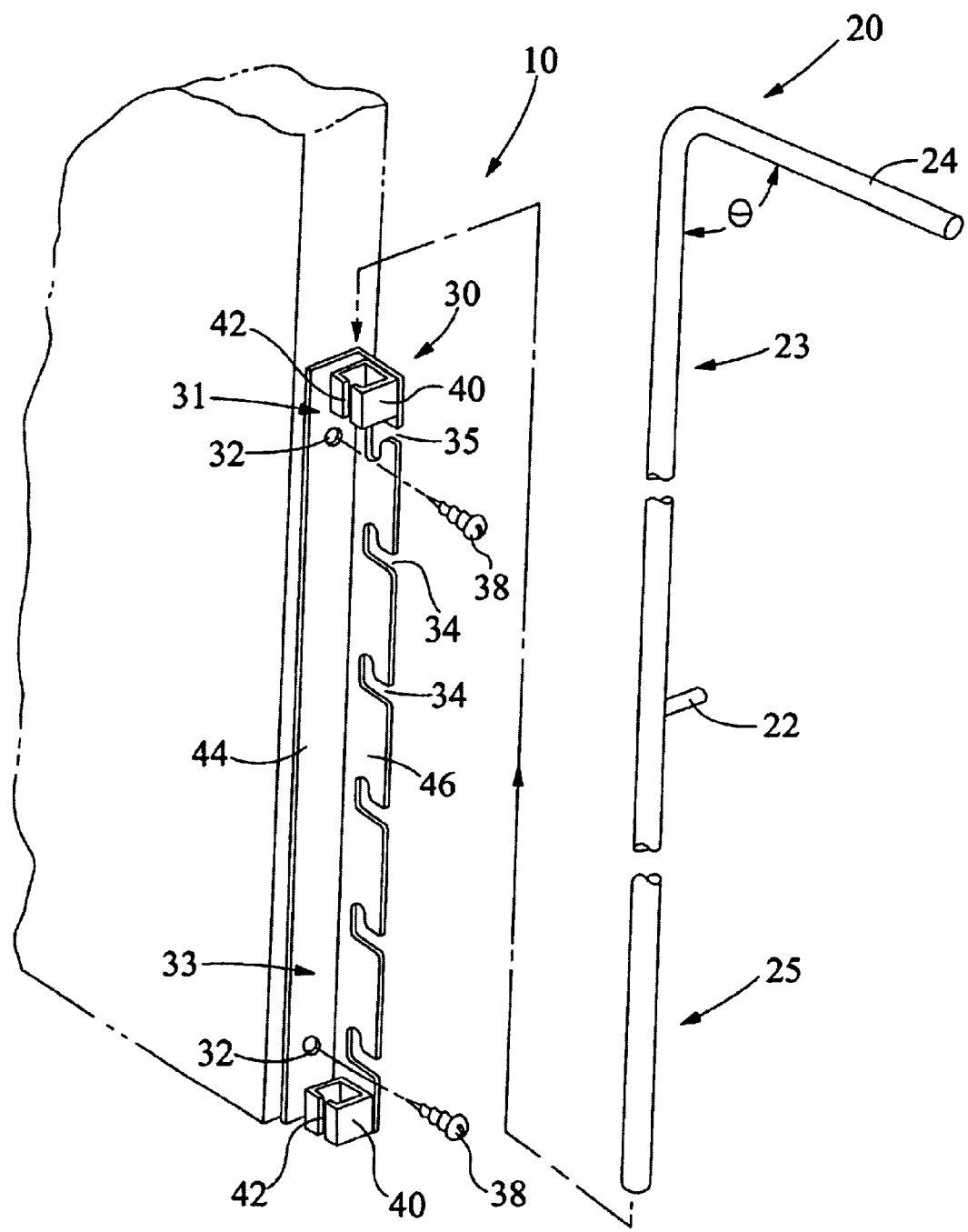
FIG. 2 shows an assembly view in perspective of the farm gate stop device.
Figure 6:
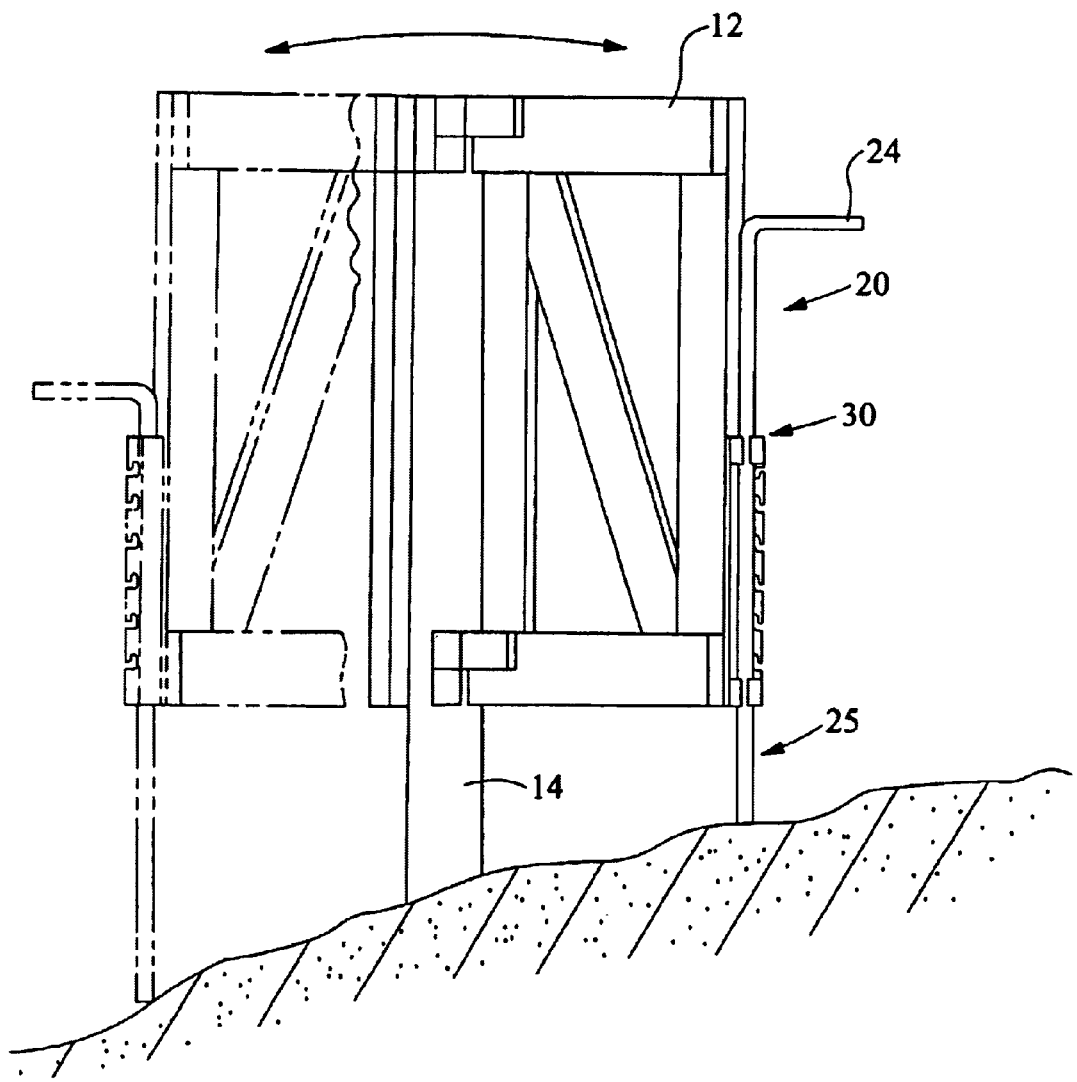

The present invention is for a farm gate stop device which allows a user to set a farm gate in an open or closed position regardless of whether the terrain is level. Referring to FIGS. 1 and 6, a farm gate assembly is shown comprising a fence 14, a hinge 16 rotatably connecting the fence 14, a gate 12, and a farm gate stop device 10.

As shown in FIGS. 2–6, the farm gate stop device 10 comprises a rod or gate support means 20 having first upper end 23, a second lower end 25, a handle 24 extending from the first upper end 23, and a stud 22 integral with rod 20 extending from the rod 20 at a location along the length of rod 20. Preferably, the rod 20 is made of hot rolled bar stock having a diameter of about three-fourths of an inch (¾") and a length of about 40 inches. The handle 24 at the upper end of the rod 20 is made by placing a 90 degree (90°) bend in the rod 20. In the embodiment shown, the handle 24 is bent at an angle θ of about 90° from the upper end 23 of the rod 20 and extends about four inches (4") from the upper end 23. The stud 22 is preferably made of hot rolled bar stock. The stud 22 is preferably about three-eighths of an inch (⅜") in diameter and extends from rod 20 by about one inch (1") at a position intermediate the ends 23,25 about 20 inches from the bottom end of rod 20. The stud 22 can be attached to rod 20 in a plurality of methods known in the art, such as welding. Alternatively, the stud 22 may be molded concurrently with the rod 20 as a unitary piece. One of skill in the art will recognize that the dimensions of the above described rod 20 are exemplary and may be varied based upon the application of the invention.

The farm gate stop device 10 further comprises a rod slide or guide means 30, preferably formed from angle iron, having an upper end 31, and a lower end 33, and defining first 44 and second legs 46. Preferably, each leg 44,46 of the angle iron is about one and one-half inches (1½") wide and about eighteen inches (18") long however various sizes may be used. Along the first leg 44 of the rod slide 30 are at least two holes 32. The holes 32 may be of various diameters but in the embodiment shown are about three-fourths inches (¾") and each of the holes 32 is located about two and one-half inches (2½") from the upper 31 and lower end 33 of first leg 44. Screws 38 extend through holes 32 into gate 12 to fixedly attach rod slide 30 to the gate 12.

Along the second leg 46 of the rod slide 30 are a plurality of notches 34, each having a substantially "L" shape. The rod slide 30 also has a top notch 35 which has a generally "T" shape. The notches or positioning means 34,35 may vary in size but preferably should be large enough to let the stud 22 be seated therein. The notches 34 are also preferably spaced apart by about two and one-half inches (2½"), thus allowing several notches along the length of second leg 46 for more adjustability.

Figures 3, 4, 5:
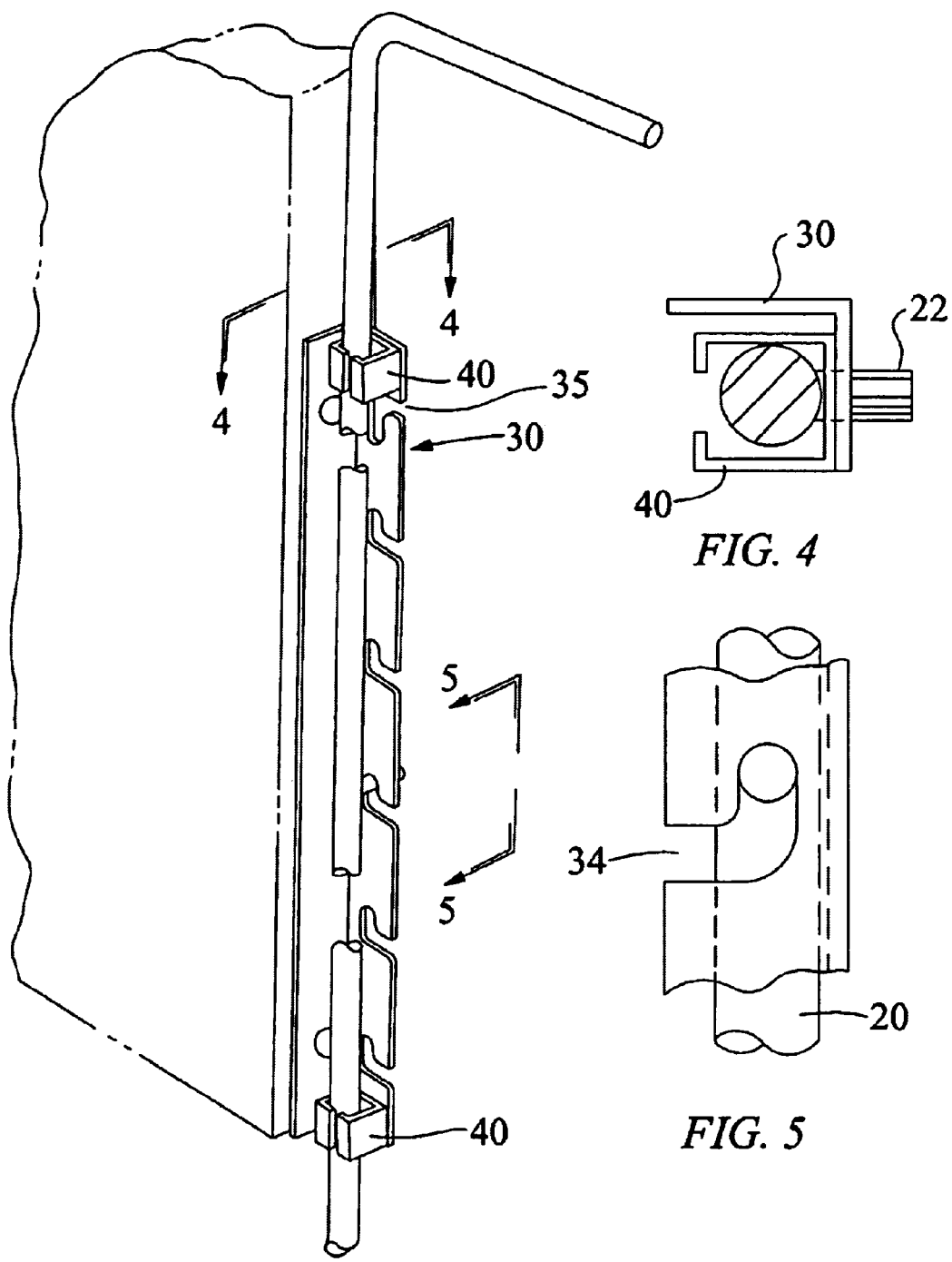
FIG. 3 shows an assembled perspective view of the farm gate stop device.
FIG. 4 shows a top sectional view of the farm gate stop device of FIG. 3 along line 4—4.
FIG. 5 shows a side view of the farm gate stop device of FIG. 3 along line 5—5; and, FIG. 6 shows a side view of the farm gate stop device of FIG. 1 along line 6—6 with the gate held open in an uphill position and, shown in phantom, on a downhill position.

Attached to the rod slide 30 along the second leg 46 is at least one guide 40. In the embodiment shown, there are two guides 40, one located at the upper end 31 and one at the lower end 33 of the rod slide 30. Each of the guides 40 is made of square tubing, preferably having about one inch (1") legs. The guide 40 has a notch 42 located therein which allows stud 22 to slide therethrough. Optionally, the guide 40 positioned at the lower end of the gate may exclude the notch 42. The notch 42 is vertically extending allowing assembly of the rod 20 and the rod slide 30. The size of notch 42 may vary as necessary to accommodate the stud 22. Thus, the notch 42 is preferably about seven-sixteenths of an inch (7/16") wide. When the rod 20 is as shown in FIGS. 4 & 5, mounted in the rod slide 30, the rod 20 slides through the guides 40 and the stud 22 can be turned to project through one of the notches 34,35.

One of skill in the art will recognize that the dimensions of the above described rod slide 30 and components thereof are exemplary and may be varied based upon the application of the invention. Further, it is understood that although the gate 12 shown in the various figures is a traditional wooden gate, the gate stop device 10 may be used on metal gates as well.

Referring to FIGS. 1–6, in use, the rod slide 30 is attached to the gate 12 using, screws 38 which makes for simple installation to a plurality of gate types during either initial gate installation or retrofit of the gate. Next, the rod 20 is slidably installed into the rod slide 30 by sliding the rod 20 though the guide 40 and aligning the stud 22 with the notch 42. Once rod 20 is through the guides 40 the gate is moved to a desired position and the handle 24 is pushed into the ground. Next, the handle 24 is rotated so that the stud 22 is located just above a notch 34,35 appropriate for holding the gate 12 in a desired position. Finally, the gate 12 is raised so that the notch 34,35 and stud 22 are aligned and stud 22 slides into the notch 34,35. The weight of the gate 12 holds the stud 22 in the notch 34,35 and thus prevents the gate from opening or closing. When the gate is in the open position, the weight of the gate is transferred from the primary gate hinges 16 to the gate stop device 10 thereby reducing wear on the hinges 16 and potentially lengthening the hinge 16 life. As shown in FIG. 6, the rod 20 can be moved within the rod slide 30 to allow the lower end 25 of the rod to hold the gate 12 in an open position on higher ground or as shown in phantom, on lower ground.

To summarize, the present invention provides a farm gate stop device suitable for use on both level and unlevel terrain. The farm gate stop device comprises a rod slide mounted to a gate and a rod slidably connected to the rod slide. The rod slide has a plurality of notches for cooperation with a stud integral with the rod. The rod slide also has at least one, rod guide which keeps the rod in a proper vertical alignment with the rod slide. The rod may be slidably adjusted within the at least one rod guide to hold the gate at which time stud is moved into the notches of the rod slide to maintain the gate in a desired position.

The invention may be embodied in various forms without departing from its spirit and essential characteristics. The described embodiments are not to be considered as restrictive. All changes which come within the meaning and range of the claims are to be embraced within the scope.

I claim:

1. A gate stop device, comprising:
    a rod having a first end and a second end;
    a stud extending from said rod intermediate said first and second ends;
    a rod slide having a plurality of notches positioned therein, said rod slide having at least one rod guide formed thereon;
    said rod slidably disposed in said rod slide;
    said notches receiving said stud in locking engagement.

2. The gate stop device of claim 1, said notches being substantially L-shaped.

3. The gate stop device of claim 2, said L-shaped notches having a first guide extending horizontally and a second guide extending upwardly.

4. The gate stop device of claim 3, said stud and rod supporting the weight of a gate.

5. The gate stop device of claim 1, said rod being about three-fourths of an inch in diameter.

6. The gate stop device of claim 1 further comprising a handle extending perpendicular from said rod.

7. A gate stop device, comprising:
    a gate having a hinge and a swinging end;
    a rod slide connected to said swinging end of said gate;
    said rod slide having at least one notch positioned therein;
    a rod slidably positioned in said rod slide and having a stud extending substantially normally therefrom;
    said at least one notch receiving said stud, said rod and stud supporting said gate.

8. The gate stop device of claim 7, said at least one notch being substantially L-shaped.

9. The gate stop device of claim 8, said at least one L-shaped notch having a first guide extending horizontally and a second guide extending upwardly.

10. The gate stop device of claim 7, said stud extending from said rod intermediate said first and second ends.

11. The gate stop device of claim 7, said stud disposed in said at least one notch and supporting said swinging end of said gate.

12. The gate stop device of claim 7, said rod slide having at least one rod guide disposed thereon.

13. The gate stop device of claim 12, said at least one rod guide being substantially square with a vertical notch therein.

14. A gate stop device, comprising:
    a gate support means having a first end, a second end, a handle at said first end and a stud extending from an intermediate of said first end and said second end;
    said gate support means slidably positioned in a guide means;
    said guide means having a plurality of positioning means;
    said stud engaging said positioning means to support a swinging end of a gate;
    said positioning means being substantially L-shaped.

15. The gate stop device of claim 14, said guide means fastened to a said swinging end of said gate.

* * * * *